United States Patent

Tabata

[11] 4,316,275
[45] Feb. 16, 1982

[54] CHARGING CONTROL CIRCUIT FOR ELECTRONIC TIMEPIECE

[75] Inventor: Junichi Tabata, Tokyo, Japan

[73] Assignee: Kabushiki Kaisha Daini Seikosha, Tokyo, Japan

[21] Appl. No.: 163,883

[22] Filed: Jun. 27, 1980

[30] Foreign Application Priority Data

Jun. 28, 1979 [JP] Japan .................................. 54-081622

[51] Int. Cl.$^3$ .............................................. G04B 9/00
[52] U.S. Cl. ...................................... 368/66; 368/203; 368/204; 320/39
[58] Field of Search ............... 320/2, 39, 40; 368/203, 368/204, 205, 66; 340/662

[56] References Cited

U.S. PATENT DOCUMENTS 3,753,072  8/1973  Jurgens .................................. 320/39
3,979,656  9/1976  Tukeda et al. .................... 368/205 X

FOREIGN PATENT DOCUMENTS 54-136873 10/1979 Japan .................................. 368/205

Primary Examiner—Ulysses Weldon
Attorney, Agent, or Firm—Robert E. Burns; Emmanuel J. Lobato; Bruce L. Adams

[57] ABSTRACT

A charging control circuit for an electronic timepiece has a power source circuit including a charging device and a secondary battery, an electronic timepiece circuit, a drive signal change-over circuit for changing an alarm signal and warning signal for excessive charge, and a buzzer driving circuit for driving a buzzer.

The buzzer sound for indicating excessive charge to the secondary battery is different from that of time alarm.

4 Claims, 4 Drawing Figures

CHARGING CONTROL CIRCUIT FOR ELECTRONIC TIMEPIECE

BACKGROUND OF THE INVENTION

The present invention relates to a charging control circuit for an electronic wristwatch, and more particularly, to a charging control circuit, wherein for the purpose of preventing a battery from excessive charging, a charging current is by-passed so as to flow through a buzzer when an excessive charging condition is detected, for warning of the excessive charging condition.

In FIG. 1, numeral 1 designates a charging device and a solar battery is used as the charging device in the embodiment of FIG. 1. Numeral 4 designates a secondary battery which acts as a power source to supply energy to an electronic circuit 5 for a timepiece, and replenishing energy is supplied to the secondary battery from the charging device 1. A charging control circuit 3 is particularly used for preventing the battery from excessive charging.

It is well known that the battery voltage of a secondary battery under an excessive charging condition is high by a voltage of 0.2 v to 0.5 v compared with that under the normal condition. Therefore, the charging control circuit 3 is realized by the use of a voltage detecting circuit which detects the increase of voltage in the secondary battery under the excessive charging condition.

A charging current by-passing circuit 2 is controlled by an output signal from the charging control circuit 3 in such a way that the charging current producing from the device 1 is by-passed to stop the charging of the secondary battery when the secondary battery is excessively charged. Therefore, the by-passing circuit is in a non-conductive condition when the secondary battery is in a normal charging or discharging condition. A reverse flow preventing diode 6 prevents the current from flowing in a direction from the secondary battery 4 to the charging device 1 when the charging device 1 is not performing the charging function.

In the conventional circuit arranged as described above, the prevention function for excessive charging is fully performed. However, the conventional circuit can not attain high efficiency in regard to an effective use of the charging energy because the charging current is dissipated in the by-pass circuit at the time of excessive charging.

SUMMARY OF THE INVENTION

The present invention is intended to eliminate the above described drawbacks, and prevent excessive charging and can warn of excessive charging by driving a buzzer, which is incorporated into an electronic wrist watch, by the charging current during the excessive charging state.

The object of the invention is to provide an electronic timepiece having a power source circuit including a charging device and a secondary battery, an electronic circuit for a timepiece driven by the power source, a charging control circuit and a buzzer driven by an output signal from said charging control circuit to both prevent excessive charging and warn of excessive charging.

BRIEF DESCRIPTION OF THE DRAWINGS

Other objects, features and advantage of the present invention will be apparent from the written discription and drawings, in which.

DESCRIPTION OF THE PREFERRED EMBODIMENT

Figure 1:
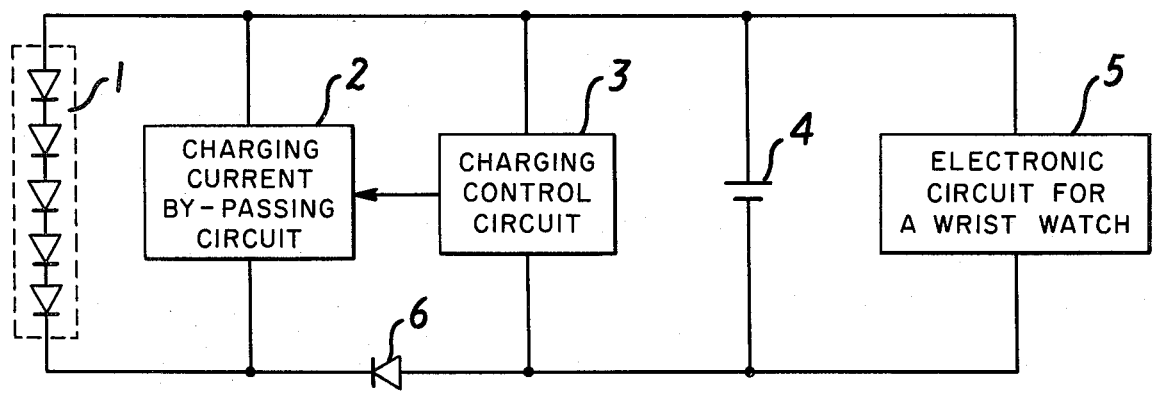
FIG. 1 illustrates a circuit diagram of a charging control circuit of the conventional electronic wrist watch.
Figure 2:
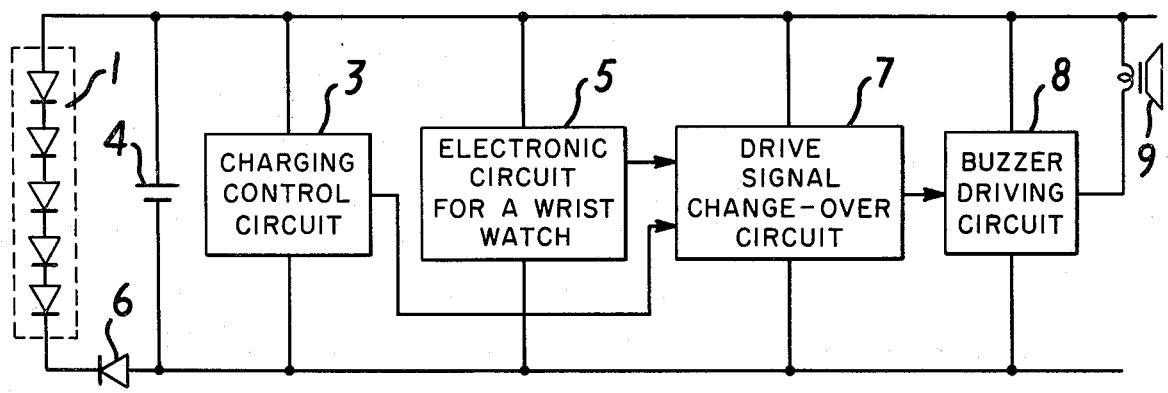
FIG. 2 illustrates a block diagram of the present invention.

The present invention will be hereinafter described in connection with the attached drawings. FIG. 2 illustrates a block diagram using for an explanation of the basic principle of the present invention. To simplify the explanation, the same portion as that in FIG. 1 is designated by the same reference numeral and the detailed explanation is omitted. Reference numeral 1 represents a charging device such as a solar battery. Battery 4 is a secondary battery. A positive electrode of the secondary battery 4 is connected to a positive electrode of the charging device 1. Diode 6 is a reverse flow preventing diode. An anode of the reverse flow preventing diode 6 is connected to a negative electrode of the secondary battery, and the cathode of the reverse flow preventing diode 6 is connected to a negative electrode of the charging device 1.

Circuit 3 is a charging control circuit. The charging control circuit 3 is connected to the secondary battery 4 in parallel to monitor the battery voltage of the secondary battery, and a buzzer driving signal for warning an excessive charging appears on an output terminal when the battery voltage reaches a predetermined excessive charging detection level. The output terminal of the charging control circuit is connected to a negative input terminal of a drive signal change-over circuit 7. Circuit 5 is an electronic circuit for a wrist watch, which is connected to the secondary battery 4 in parallel. In an wrist watch having a time alarm function, a buzzer driving signal for a time alarm is output from an output terminal of the electronic circuit 5 for a wristwatch or timepiece.

The output terminal of the electronic circuit 5 for a wristwatch is connected to another input terminal of the drive signal change-over circuit 7.

An output terminal of the drive signal change-over circuit 7, which is connected to the secondary battery 4 in parallel, is connected to an input terminal of a buzzer driving circuit 8. An output terminal of the buzzer driving circuit 8, which is connected to the secondary battery 4 in parallel, is connected to a buzzer 9.

Now, the operation of the above described circuit will be explained.

When the secondary battery is charged by the charging device 1 to an excessive charging state, the charging control circuit 3 detects the excessive charging state to produce the buzzer driving signal. The drive signal change-over circuit 7 sends out the buzzer driving signal for warning an excessive charging to the buzzer driving circuit 8 by receiving the buzzer driving signal, and the buzzer driving circuit 8 drives the buzzer to warn of excessive charging. The electric circuit leads connecting the buzzer 9 to the charging device 1 constitute means for connecting the buzzer alarm to be powered by the charging device so that at this time, a large current for driving the buzzer is supplied from the charging device 1, so that the charging operation for the secondary battery is stopped. As a result, excessive charging can be prevented. After this, when the charging condition of the secondary battery becomes a normal charging/discharging state due to dissipation of the energy of the secondary battery, the charging control circuit 3 stops producing the buzzer driving signal so that the buzzer stops ringing. As a result, since a large load is removed, the secondary battery can be charged again.

Figure 3:
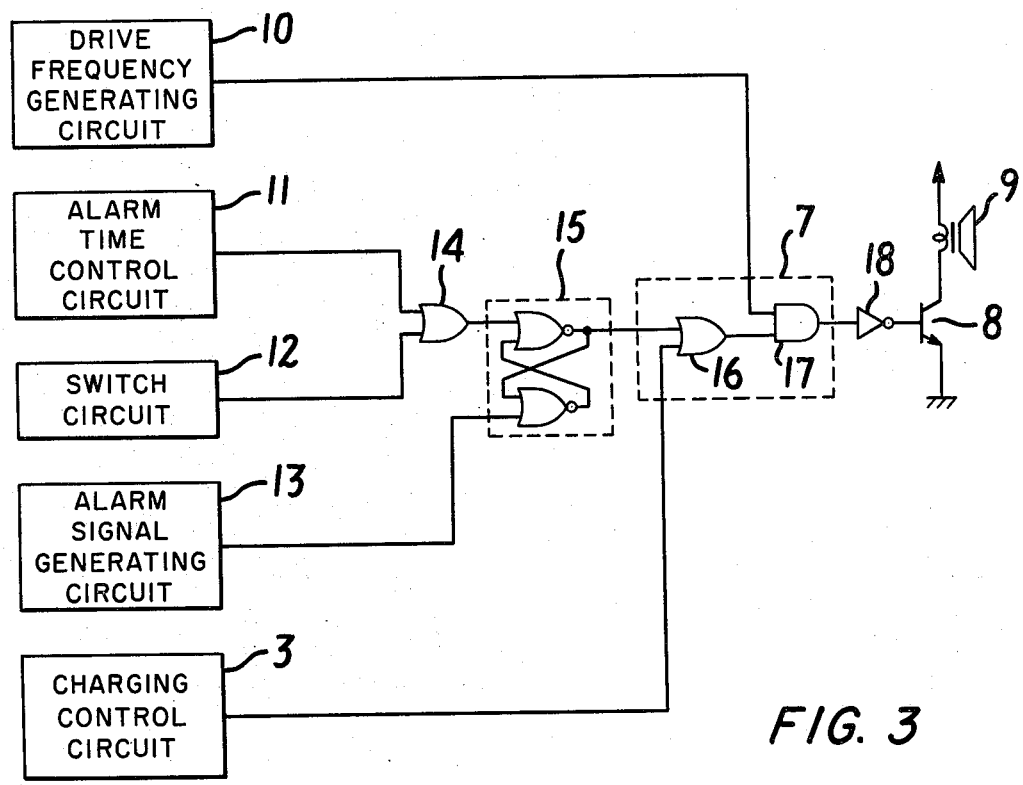
FIG. 3 illustrates a circuit diagram of one embodiment of the present invention; and, FIG. 4 illustrates a circuit diagram of another embodiment of the present invention.

FIG. 3 illustrates a circuit diagram of one embodiment according to the present invention. Circuit 3 is a charge control circuit. Circuit 10 is a drive frequency generating circuit. Circuit 11 is an alarm time control circuit and 12 is a switch circuit. Circuit 13 is an alarm signal generating circuit. One input terminal of an OR gate 14 is connected to an output terminal of the alarm time control circuit 11, and the other input terminal thereof is connected to an output terminal of the switch circuit 12. An output terminal of the circuit 11 is connected to a reset terminal of a flip-flop (which be referred to as F·F, hereinafter), A set terminal of the F·F 15 is connected to the alarm signal generating circuit 13 and an output terminal of the F·F 15 is connected to one input terminal of an OR gate 16. The other input terminal of the OR gate 16 is connected to the output terminal of the charging control circuit 3, and the output terminal of the OR gate 16 is connected to one input terminal of an AND gate 17 and the other input terminal is connected to an output terminal of the drive frequency generating circuit 10, and an output terminal of the AND gate 17 is connected to an input gate of a pre-driver 18. An output terminal of the pre-driver 18 is connected to a base of a NPN transistor in the buzzer driving circuit 8. An emitter of the buzzer driving circuit 8 is connected to a negative electrode of the secondary battery and a collector is connected to a positive electrode of the secondary battery through the buzzer 9.

Now, the operation of the circuit will be described. The ringing operation of the buzzer can be carried out in two cases. A first case of buzzer operation is the case of time alarm operation. When the F·F 15 is set by the output signal from the alarm signal generating circuit 13 and the output level of the F·F 15 becomes logical "1" level, the output level of the OR gate 16 becomes logical "1" level. At this time, the signal produced from the drive frequency generating circuit 10 passes through the AND gate 17 and the signal is applied to the driving circuit 8 through the pre-driver 18 to drive the buzzer 9 at a predetermined frequency. The buzzer ringing operation is continued from after a lapse of a predetermined set time to the time when the alarm time control circuit 11 resets the F·F 15 through the OR gate 14. The ringing of the buzzer may be stopped when the F·F 15 is reset by the application of the output signal from the switch circuit 12 by the manipulation of an external switch.

The second case is the case wherein, the operation for preventing an excessive charging and the warning operation for an excessive charging are carried out at the time of an excessive charging. When the secondary battery condition becomes one of excessive charging, the output level of the charging control circuit 3 changes from "0" level to "1" level in accordance with the result of voltage detection by the circuit 3.

At this time, the output level of the OR gate 16 becomes "1", and the driving signal produced from the drive frequency generating circuit 10 is applied to the driving circuit 8 for driving the buzzer 9 through the AND gate 17 and the pre-driver 18. When the buzzer is driven, since the charging current is dissipated in the buzzer, the excessive charging can be prevented. Since the output level of the charging control circuit 3 becomes logical "0" level when the charging/discharging state of the secondary battery is returned to a normal condition, the ring of the buzzer for a warning of excessive charging is stopped and, at the same time, the secondary battery can be charged again.

Figure 4:
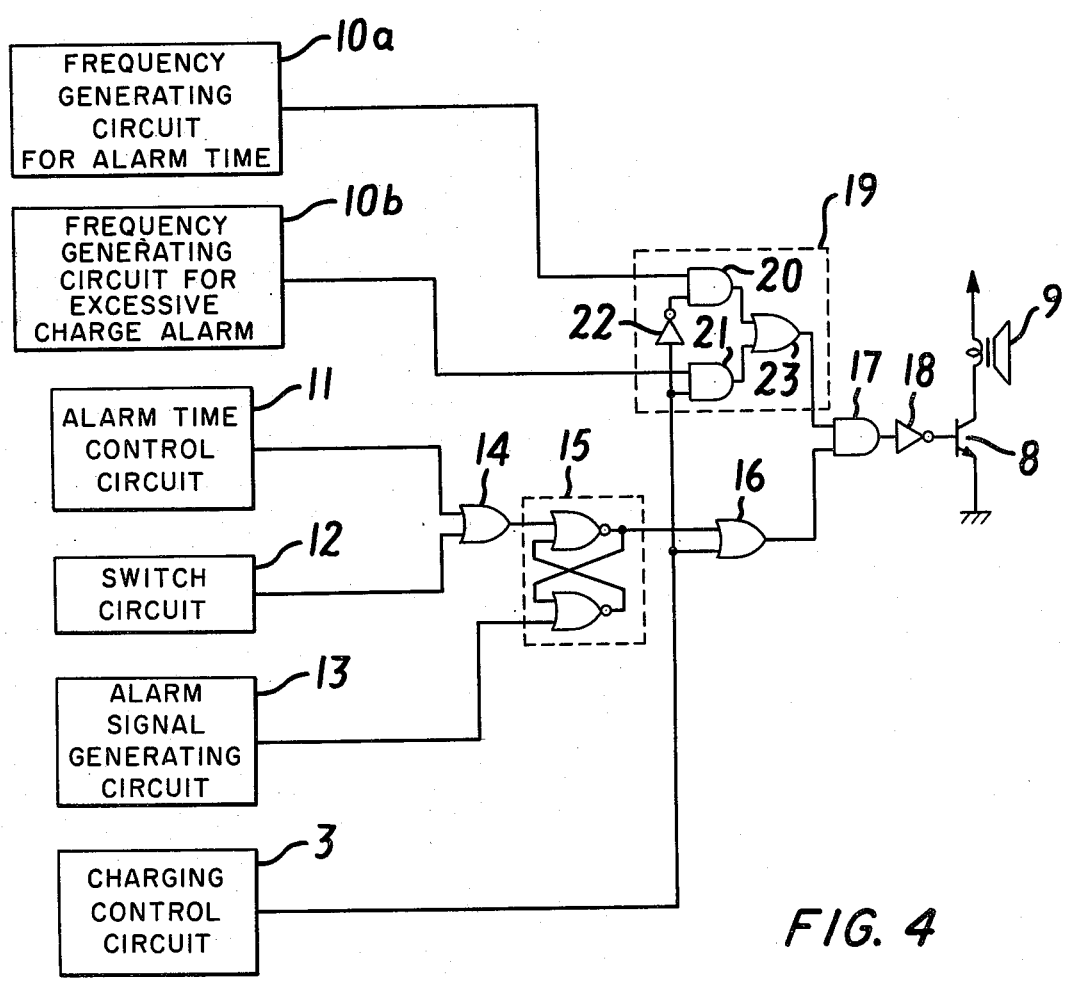

FIG. 4 illustrates a circuit diagram of another embodiment of the present invention. This circuit is adapted to change the buzzer tone to distinguish between the time alarm operation and the excessive charging condition. The same element as that of FIG. 3 is designated by the same reference numeral and the explanation thereto is omitted.

Circuit 3 is a charging control circuit. Circuit 10a is a frequency generating circuit for alarm time and 10b is a frequency generating circuit for excessive charge alarm. Circuit 11 is an alarm time control circuit and 12 is a switch circuit. Circuit 13 is an alarm signal generating circuit.

Circuit 19 is a frequency change-over circuit composing of AND gates 20, 21, an inverter 22 and an OR gate 23. An output terminal of the frequency generating circuit 10a for alarm time is connected to one input terminal of the AND gate 20. An output terminal of the frequency generating circuit 10b for excessive charge alarm is connected to one input terminal of the AND gate 21. An output terminal of the charging control circuit 3 is connected to the other input terminal of the AND gate 21 and to the other input terminal of the AND gate 20 through the inverter 22. One input terminal of the OR gate 23 is connected to an output terminal of the AND gate 20, the other input terminal of the OR gate 23 is connected to an output terminal of the AND gate 21. An output terminal of the OR gate 23 is connected to one input terminal of the AND gate 17. The connection to the second input terminal of the AND gate 17 is the same as that of FIG. 3 so that the description of the connection is omitted.

The operation of this circuit will now be described.

Since the output level of the charging control circuit 3 becomes logical "1" level when the secondary battery is in an excessive charging condition, at this time, a frequency signal for alarm time can not pass through the AND gate 20 and a frequency signal for excessive charge alarm is applied to the driving circuit 8 through the AND gate 21, the OR gate 23 and the AND gate 17. On the other hand, since the output level of the charging control circuit 3 is logical "0" level when the secondary battery is in a normal charging/discharging condition, only the frequency signal for alarm time can pass through the frequency change-over circuit 19.

Therefore, by setting the frequency of the driving signal for alarm time to differ from the frequency of the driving signal for excessive charge alarm, it is possible to distinguish the buzzer tone for an alarm time from the buzzer tone for an excessive charge alarm.

As described above, according to the present invention, it is possible to provide an electronic wristwatch, wherein since the buzzer can be operated by the charging current bypassed after the detection of an excessive charging state, the operation of preventing excessive charging and the excessive charging warning operation can be performed at the same time and a person who has the watch can quickly stop the charging operation by a proper method (e.g. by cutting off the light beam when a solar battery is used as the charging device) due to an alarm sound for excessive charging so that damage to the secondary battery can be reduced to the minimum degree. Therefore, an electronic wristwatch having a high efficiency charging system can be provided.

What I claim is:

1. An electronic timepiece, comprising:
   an electronic timepiece circuit comprising means for generating a time alarm signal;
   an electric power source for powering said electronic timepiece circuit, said electric power source comprising a rechargeable secondary power cell and charging means for charging said power cell;
   a charging control circuit for detecting the voltage of said secondary power cell and for generating an output control signal when said secondary power cell is excessively charged;
   alarm means responsive to a drive signal for generating an alarm; and
   drive signal change-over means responsive to the time alarm signal from said electronic timepiece circuit for applying a drive signal to said alarm means to generate an alarm to indicate an alarm time and responsive to the control signal from said charging control circuit for applying a drive signal to said alarm means to generate an alarm to indicate that said secondary power cell is being excessively charged.

2. An electronic timepiece according to claim 1, further comprising:
   means for generating respective driving frequency signals each having a different frequency and for applying the driving frequency signals to said drive signal change-over means; and
   wherein said drive signal change-over means comprises means responsive to the driving frequency signals for applying driving signals having different respective frequencies to said alarm means to distinguish by an alarm frequency between an alarm time and a condition wherein said secondary power cell is being excessively charged.

3. An electronic timepiece according to claim 1 or 2 comprising means for connecting said alarm means to be powered by said charging means when said alarm means is enabled by a drive signal applied thereto by said drive signal change-over means so as to dissipate excessive charging current.

4. An electronic timepiece according to claim 1 or 2, wherein said alarm means is comprised of a buzzer for generating an audible alarm.

* * * * *